US006161982A

United States Patent [19]

Cole

[11] Patent Number: 6,161,982

[45] Date of Patent: Dec. 19, 2000

[54] ASSEMBLY WITH A SEALED COUPLER

[75] Inventor: James E. Cole, Plano, Tex.

[73] Assignee: Splined Tools Corporation, Richardson, Tex.

[21] Appl. No.: 09/063,883

[22] Filed: Apr. 22, 1998

[51] Int. Cl.[7] .......... F16B 9/02

[52] U.S. Cl. .......... 403/97; 403/298; 81/177.8

[58] Field of Search .......... 403/91, 92, 93, 403/96, 97, 103, 95, 146, 298; 81/177.8, 177.7, 177.85, 177.9

[56] References Cited

U.S. PATENT DOCUMENTS

| | | |
|---|---|---|
| Re. 36,407 | 11/1999 | Rocco . |
| 151,315 | 5/1874 | Rowe . |
| 624,643 | 5/1899 | Gaylor . |
| 662,966 | 12/1900 | Robertson . |
| 928,375 | 7/1909 | Frick . |
| 1,077,575 | 11/1913 | Wutke . |
| 1,109,032 | 9/1914 | Bersted . |
| 1,217,217 | 2/1917 | Reagan, Jr. . |
| 1,286,506 | 12/1918 | Beery . |
| 1,355,455 | 10/1920 | Doughty . |
| 1,568,442 | 1/1926 | Carver . |
| 1,840,685 | 1/1932 | Witherup . |
| 2,420,132 | 5/1947 | Gryniuck . |
| 2,603,325 | 7/1952 | Pickard . |
| 2,638,677 | 5/1953 | Sheriff . |
| 2,671,367 | 3/1954 | Modin . |
| 2,691,316 | 10/1954 | Brame . |
| 2,708,855 | 5/1955 | Fish . |
| 2,921,773 | 1/1960 | Hoelzer . |
| 3,002,409 | 10/1961 | Jones . |
| 3,039,339 | 6/1962 | Hanson . |
| 3,119,591 | 1/1964 | Malecki . |
| 3,175,436 | 3/1965 | Coleman . |
| 3,188,895 | 6/1965 | Jones . |
| 3,270,597 | 9/1966 | Neff et al. . |
| 3,314,316 | 4/1967 | Shoults . |
| 3,550,486 | 12/1970 | Edwards . |
| 3,733,936 | 5/1973 | Flynn . |
| 3,779,107 | 12/1973 | Avery . |
| 4,027,558 | 6/1977 | Fish . |
| 4,145,124 | 3/1979 | Weisgerber . |
| 4,184,783 | 1/1980 | Hall . |
| 4,244,237 | 1/1981 | Sprunger . |
| 4,270,417 | 6/1981 | Tesoro . |
| 4,281,601 | 8/1981 | Overman . |
| 4,406,186 | 9/1983 | Gummow . |
| 4,479,409 | 10/1984 | Antonius . |
| 4,520,697 | 6/1985 | Moetteli . |
| 4,543,007 | 9/1985 | Quiogue . |
| 4,582,445 | 4/1986 | Warshawsky . |
| 4,596,167 | 6/1986 | White, Jr. . |
| 4,614,452 | 9/1986 | Wang . |
| 4,619,540 | 10/1986 | Day et al. . |

(List continued on next page.)

FOREIGN PATENT DOCUMENTS

| | | |
|---|---|---|
| 996786 | 11/1973 | Canada . |
| 3023 882 A1 | 3/1982 | Germany . |
| 14270 | of 1913 | United Kingdom . |
| 2132764 | 7/1984 | United Kingdom . |
| 2132926 | 7/1984 | United Kingdom . |
| WO 95/34408 | 3/1995 | WIPO . |

OTHER PUBLICATIONS

Truecraft Tools, Div. of Daido Corporation, "The Ratchet with All The Angles", Item #7336.

*Primary Examiner*—Harry C. Kim
*Attorney, Agent, or Firm*—Richard J. Veltman

[57] ABSTRACT

A sealed coupler includes a splined pin that moves axially inside orifices formed in the two or more members, and a rotating actuator. The actuator can be threaded to engage a threaded end of the pin, or it can include one or more cams to engage one or more cam followers coupled to the pin to move the pin inside the orifices. The pin moves axially between a locking position, where the members are rotationally locked, and an unlocking position, where the members are free to rotate relative to each other, in response to rotation of the actuator.

12 Claims, 6 Drawing Sheets

U.S. PATENT DOCUMENTS

| | | | |
|---|---|---|---|
| 4,747,328 | 5/1988 | Howard . | |
| 4,774,862 | 10/1988 | Scull . | |
| 4,794,829 | 1/1989 | Mesenhoeller . | |
| 4,800,785 | 1/1989 | Christensen . | |
| 4,805,494 | 2/1989 | Santoro . | |
| 4,901,608 | 2/1990 | Shieh . | |
| 4,921,271 | 5/1990 | Berry et al. . | |
| 4,929,113 | 5/1990 | Sheu . | |
| 4,982,732 | 1/1991 | Morris . | |
| 4,991,470 | 2/1991 | Singleton . | |
| 4,993,862 | 2/1991 | Pelta . | |
| 5,039,118 | 8/1991 | Huang | 403/97 X |
| 5,056,805 | 10/1991 | Wang . | |
| 5,062,179 | 11/1991 | Huang . | |
| 5,123,768 | 6/1992 | Franklin . | |
| 5,197,817 | 3/1993 | Wood et al. . | |
| 5,386,747 | 2/1995 | Grover . | |
| 5,419,221 | 5/1995 | Cole . | |
| 5,471,899 | 12/1995 | Twomlow . | |
| 5,503,048 | 4/1996 | Moon . | |
| 5,522,287 | 6/1996 | Chiang . | |
| 5,564,852 | 10/1996 | Maxwell et al. . | |
| 5,581,838 | 12/1996 | Rocco . | |
| 5,694,818 | 12/1997 | Nickipuck . | |
| 5,820,288 | 10/1998 | Cole | 403/97 |
| 5,879,100 | 3/1999 | Winkler . | |
| 5,911,800 | 6/1999 | Roberts et al. . | |
| 5,941,141 | 8/1999 | Whitley . | |

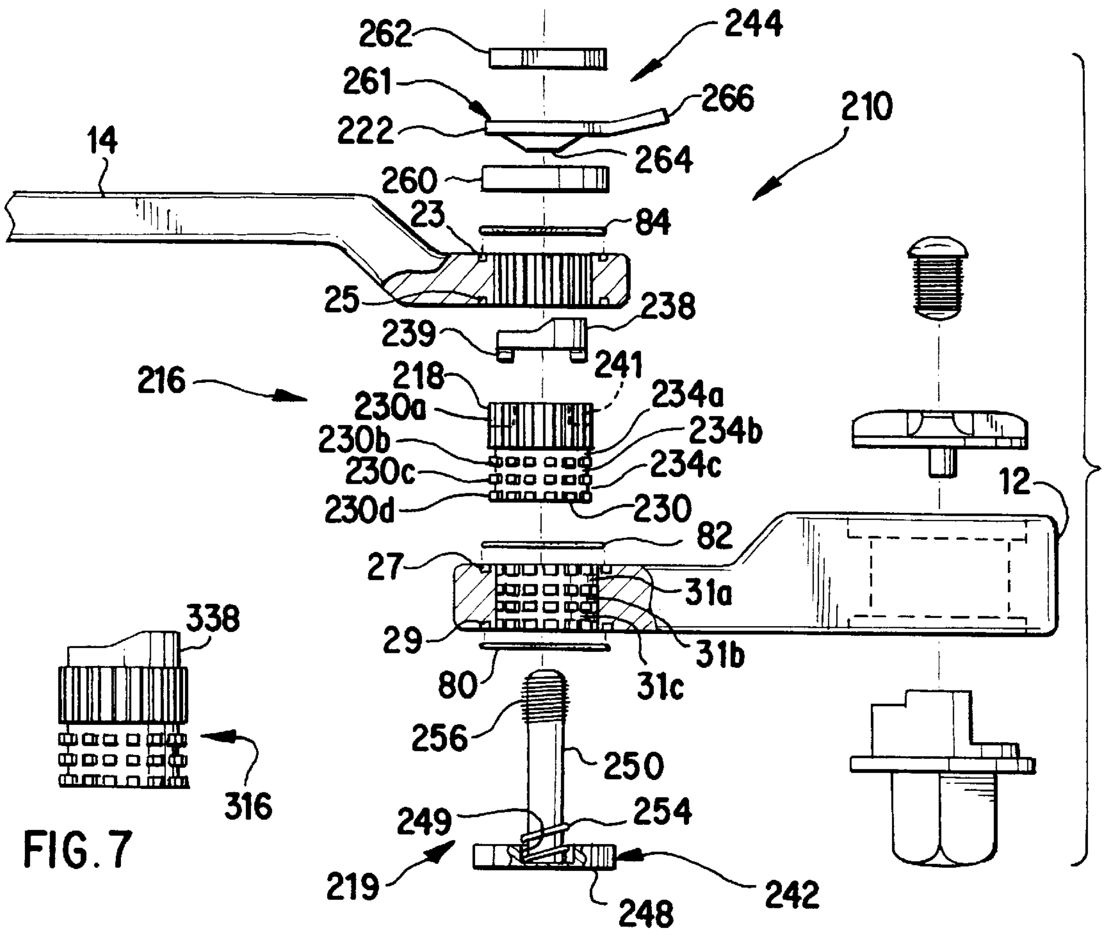
FIG.7
FIG.6
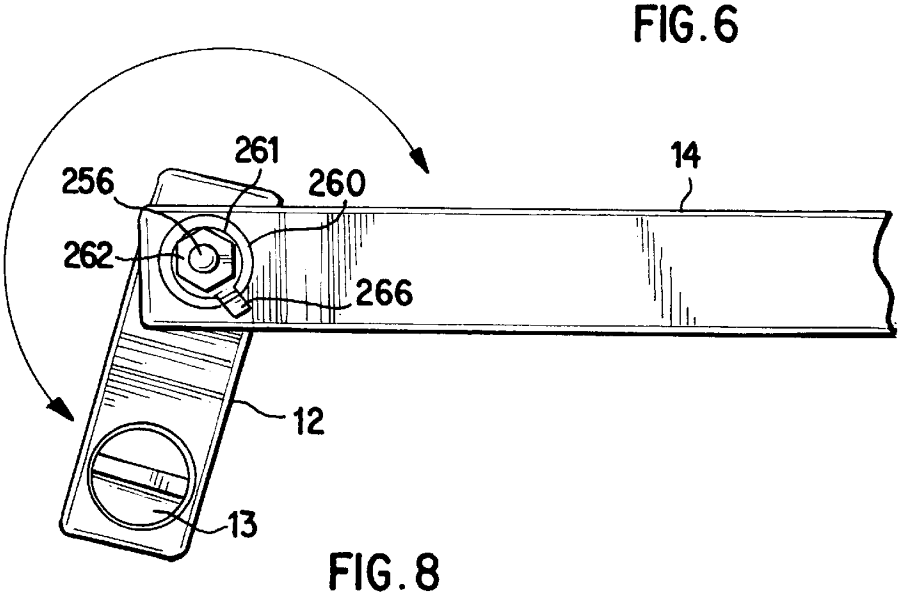
FIG.8

ASSEMBLY WITH A SEALED COUPLER

The present invention relates to couplers for coupling two members together, such as a tool head and a handle, and particularly to sealed couplers. More particularly, the invention relates to sealed couplers having a splined pin.

BACKGROUND OF THE INVENTION

Adjustable devices have been known in the art for years. Likewise, it is known to use splined pins to couple two members of such adjustable devices together. For example, U.S. Pat. No. 5,581,838 to Rocco, U.S. Pat. No. 5,419,221 to Cole, and U.S. Pat. No. 4,929,113 to Sheu each disclose the use of a splined pin for coupling two members together. However, in each of those devices, a portion of the pin extends beyond one of the members, thereby being exposed to dirt, grease, or other contaminants. Such contaminants can work their way into the mechanism and interfere with the operation of the device.

SUMMARY OF THE INVENTION

The present invention overcomes this disadvantage, and others, by providing a sealed coupler for coupling two or more members. The sealed coupler includes a splined pin that moves axially inside orifices formed in the two or more members and a rotating actuator. The actuator can be threaded to engage a threaded end of the pin, or it can include one or more cams to engage one or more cam followers coupled to the pin to move the pin inside the orifices. The pin moves between a locking position, where the members are rotationally locked, and an unlocking position, where the members are free to rotate relative to each other.

The coupler includes a retainer for retaining the pin in the orifices. Advantageously, a first seal is disposed between the retainer and one of the members, and a second seal is disposed between the actuator and a second member to seal the pin and orifices from contaminates. A seal can also be disposed between the first and second members. If more than two members are coupled together by the coupler, seals can be disposed, as appropriate, between the various members.

According to the invention, an adjustable coupler for coupling a first member to a second member comprises a pin having a first end, a second end, and a plurality of longitudinally extending splines. The first end includes a first groove that divides the pin into a first splined portion and a second splined portion. The second end includes a threaded portion. The second splined portion extends longitudinally between the first groove and the threaded portion.

The coupler further includes a rotatable actuator coupled to the second end of the pin. The pin moves axially between a locking position and an unlocking position in response to rotation of the actuator about a longitudinal axis of the pin.

The coupler further includes a first seal disposed adjacent the first end of the pin and a second seal disposed adjacent the second end.

The coupler further includes a first retainer coupled to the first end of the pin and a second retainer coupled to the second end of the pin. The first and second retainers cooperate to retain the pin in the first and second orifices. The first and second seals are disposed between the first and second retainers and the first and second members, respectively.

The first member includes a first splined orifice and the second member includes a second splined orifice that are configured to engage the pin. The second splined orifice includes a second groove sized to receive the first splined portion of the pin, the pin being rotatable in the second splined orifice when the first splined portion is received in the second groove.

In preferred embodiments, the first groove includes a first plurality of grooves and the second groove includes a second plurality of grooves.

In other preferred embodiments, the second end of the pin includes a cam follower and the rotatable actuator includes a disk having a cam. The actuator is disposed adjacent the pin with the cam in position to engage the cam follower. The pin moves axially between a locking position and an unlocking position in response to rotational movement of the actuator that brings the cam into engagement with the cam follower.

BRIEF DESCRIPTION OF THE DRAWINGS

FIG. 6 is an exploded side view of a second embodiment of the invention incorporating a cam and a cam follower to move a splined pin between the locking and unlocking positions;

FIG. 7 is an alternative embodiment of the splined pin of FIG. 6 with the cam follower formed integrally with the pin;

FIG. 8 is a top plan view of the embodiment of FIG. 6;

DETAILED DESCRIPTION OF THE DRAWINGS

Figure 1:
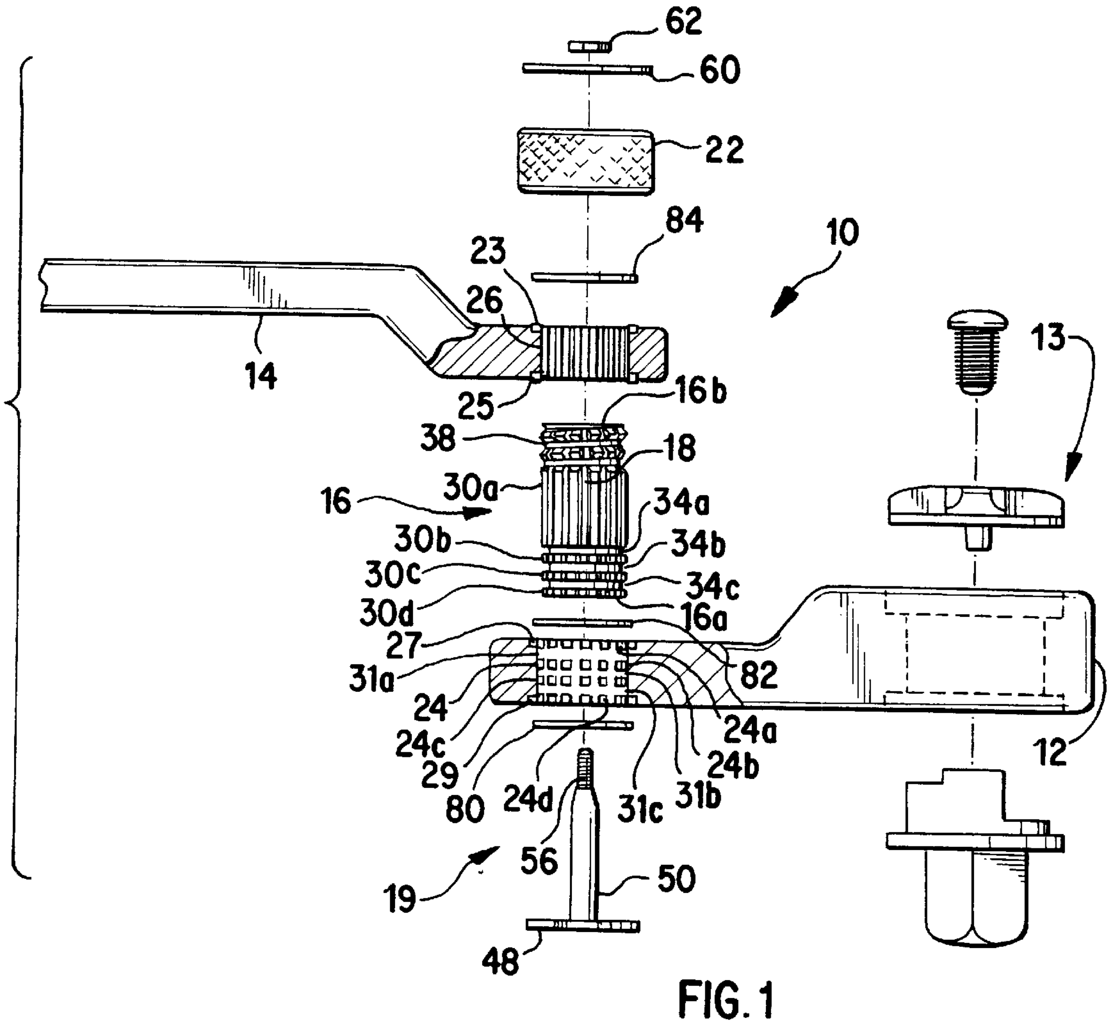
FIG. 1 is an exploded view of a ratchet wrench incorporating an adjustable coupler according to the present invention.
Figure 2:
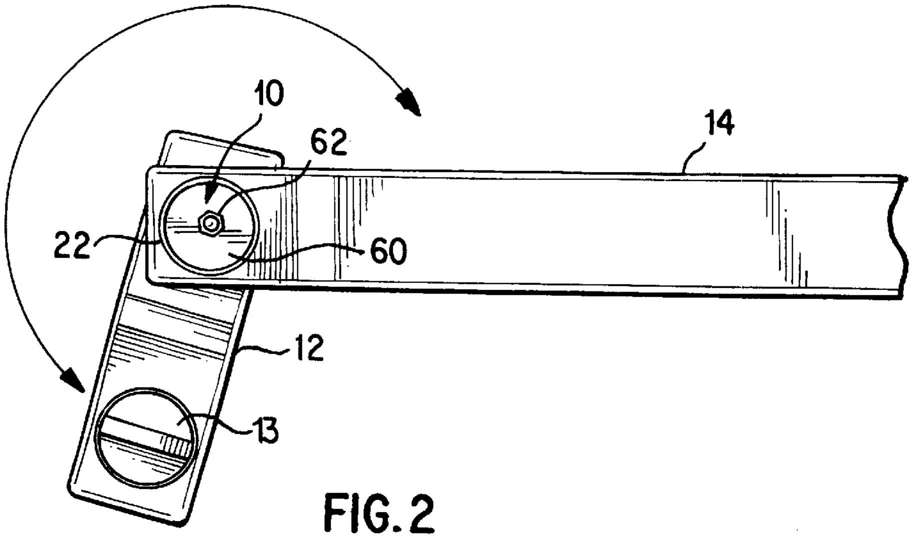
FIG. 2 is a top plan view of the wrench of FIG. 1.

The present invention includes a coupler 10 for adjustably coupling a first member 12 to a second member 14. The coupler 10 includes a splined pin 16, having a plurality of longitudinally extending external splines 18 and a longitudinally extending central bore 20 (FIG. 3), an actuator 22 and a retainer 19. The first member 12 includes a first splined orifice 24 and the second member includes a second splined orifice 26. The first and second splined orifices 24, 26 are sized and configured to engage the splined pin 16. The first and second members 12, 14 each include upper and lower annular seal receiving channels 23, 25, 27, 29 surrounding the splined orifices 24, 26. In preferred embodiments, the first member 12 includes a ratchet head having a ratchet mechanism 13.

A first end 16*a* of the pin 16 includes first, second, and third circumferential grooves 34*a*, 34*b*, 34*c*. The grooves 34*a*, 34*b*, 34*c* have a depth equal to the height of the splines 18. The grooves 34*a*, 34*b*, 34*c* divide the first end 30 into first, second, third and fourth splined portions 30*a*, 30*b*, 30*c*, 30*d* with splined portions 30*b*, 30*c*, 30*d* having a width substantially equal to the width of the grooves 34*a*, 34*b*, 34*c*. A second end 16*b* of the pin 16 includes a threaded portion 38. The length of the pin 16 is greater that the combined axial length of the orifices 24, 26.

The first splined orifice 24 includes first, second, and third grooves 31*a*, 31*b*, 31*c* that divide the orifice 24 into first, second, third and fourth orifice portions 24*a*, 24*b*, 24*c*, 24*d*. The grooves 31*a*, 31*b*, 31*c* are sized and spaced apart to receive the splined portions 30*a*, 30*b*, 30*c*, formed on the pin 16, while the orifice portions 24*a*, 24*b*, 24*c* are sized to fit within the grooves 34*a*, 34*b*, 34*c* formed on the pin 16.

Figure 3:
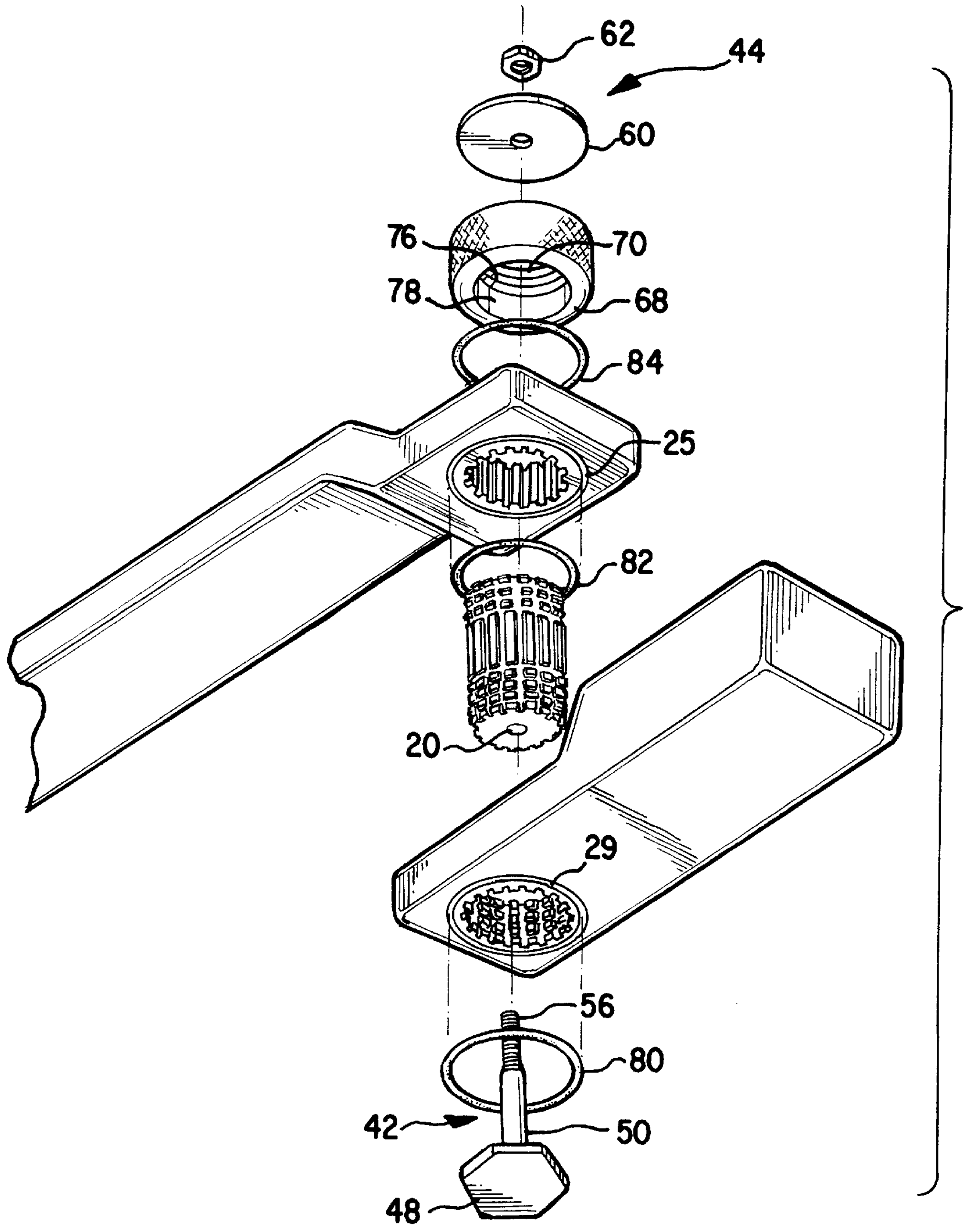
FIG. 3 is an exploded perspective view of the adjustable coupler of FIG. 1.

As best seen in FIG. 3, the actuator 22 includes a cylindrical sidewall 68 and an end wall 70 having a central aperture (not shown) sized to receive the retainer 19. The sidewall 68 includes internal threads 76 formed adjacent the end wall 70 and a smooth portion 78 disposed adjacent to the threads 76.

The retainer 19 includes a first retainer 42 and a second retainer 44 cooperating with the actuator 22 to operatively retain the pin 16 in the splined orifices 24, 26. The first retainer 42 includes a base 48 and a shaft 50 with a threaded distal end 56. The base 48 is sized to overlap the splined orifices 24, 26 to prevent the retainer 42 from entering the orifices 24, 26. The shaft 50 is attached to the base 48 and extends orthogonally therefrom. The shaft 50 is longer than the pin 16 and is sized to fit in the central bore 20 with the threaded distal end 56 extending beyond the pin 16. The second retainer 44 includes a washer 60 and a nut 62. The washer 60 operatively abuts the end wall 70 of the activator 22 and the nut 62 engages the threaded distal end 56 of the shaft 50 to retain the actuator 22 in position.

A plurality of seals 80, 82, 84 keep contaminants out of the coupler 10. A first seal 80 is disposed in the seal receiving channel 29 and between the first retainer 42 and the first member 12. A second seal 82 is disposed in the seal receiving channels 25, 27 and between the first and second members 12, 14. A third seal 84 is disposed in the seal receiving channel 23 and between the actuator 22 and the second member 14.

The coupler 10 is assembled by putting seals 80, 82, 84 into the seal-receiving channels 23, 25, 27, 29 and inserting the splined pin 16 into the splined orifices 24, 26. The retainer 19 is installed by inserting the shaft 50 into the central bore 20 of the pin 16 with the base 48 disposed against the seal 84 at the bottom of the first member 12. The actuator 22 is threaded onto the threaded portion 38 of the pin 16, with the cylindrical sidewall 68 abutting the seal 80 and the threaded distal end 56 of the shaft 50 extending through, and above, the end wall 70 of the actuator 22. The washer 60 is placed on the threaded distal end 56 adjacent the end wall 70, and the nut 62 is threaded onto the distal end 56 to hold the washer 60 and actuator 22 in position.

Figure 4:
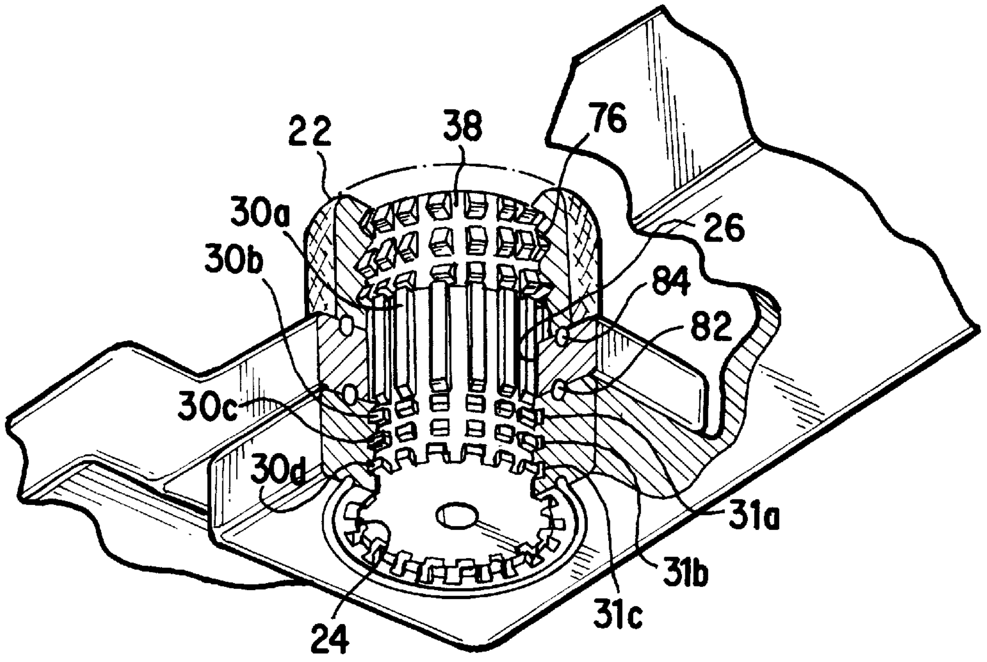
FIG. 4 is a perspective view, partially cut away, illustrating the splined pin in the unlocking position.

When the pin 16, actuator 22 and retainer 19 are installed, the splined pin 16 is operatively disposed in the splined orifices 24, 26 for axial movement between an unlocking position and a locking position. In the unlocking position, illustrated in FIG. 4, the first and second members 12, 14 are rotationally locked to each other. In the unlocking position, illustrated in FIG. 5, the first and second members 12, 14 are free to rotate relative to each other.

In the unlocking position, the splined portions 30*b*, 30*c*, 30*d* of the pin 16 are disposed in the grooves 31*a*, 31*b*, 31*c*, respectively. Splined portion 30*a* is removed from the second orifice 24 and the first member 12 is free to rotate about the pin 16.

Figure 5:
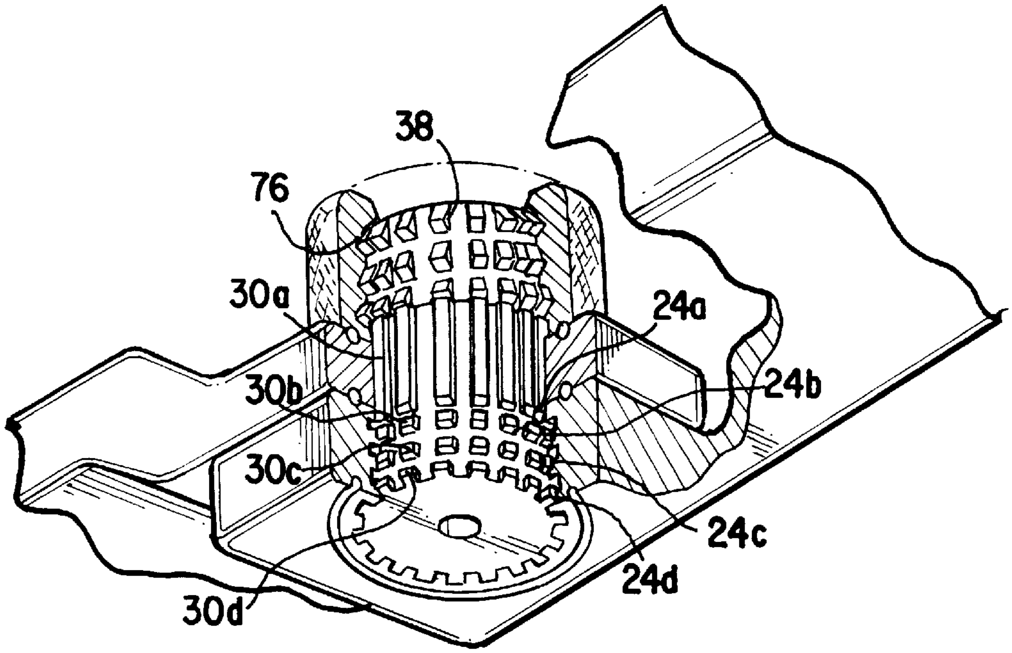
FIG. 5 is a view similar to FIG. 4 illustrating the splined pin in the locking position.

To move the pin 16 to the locking position, illustrated in FIG. 5, the actuator 22 is rotated counterclockwise, when viewed from above, to "unscrew" the actuator 22. However, the retainer 19, not shown in FIGS. 4–5 for clarity, prevents the actuator 22 from moving upwardly. Thus, the threads 76 act against the threaded portion 38 to push the pin 16 downwardly, aligning the splined portions 30*a*, 30*b*, 30*c*, 30*d* of the pin 16 with the splined orifice portions 24*a*, 24*b*, 24*c*, 24*d*, respectively. When the respective splined portions are aligned, the first member 12 is rotationally locked to the pin 16 and thereby locked to the second member 14.

To move the pin 16 to the unlocking position, the actuator 22 is rotated clockwise. The seal 80 and the second member 14 prevent the actuator 22 from moving down on the pin 16, so that the threads 76 act against the threaded portion 38 to pull the pin 16 upwardly in the orifices 24, 26 to the unlocking position.

Thus, the present invention provides a sealed coupler for adjustably forming a first member to a second member by moving a splined pin axially in response to rotational movement of an actuator.

A second embodiment includes a coupler 210 for adjustably coupling together the first and second members 12, 14, where like numbers refer to like items. The coupler 210 includes a splined pin 216, having a plurality of longitudinally extending external splines 218 and a longitudinally extending central bore 220, and an actuator 222.

A first end 230 of the pin 216 includes first, second, and third circumferential grooves 234*a*, 234*b*, 234*c*. The grooves 234*a*, 234*b*, 234*c* have a depth equal to the height of the splines 218. The grooves 234*a*, 234*b*, 234*c* divide the first end 230 into first, second, third and fourth splined portions 230*a*, 230*b*, 230*c*, 230*d*, with each splined portion 230*b*, 230*c*, 230*d* having a width substantially equal to the width of the grooves 31*a*, 31*b*, 31*c* in the first orifice 24. A cam follower 238 is coupled to the second end of the pin 216. The cam follower 238 includes a pair of downwardly depending shoulders 239 sized and configured to fit into slots 241 formed in the top of the pin 216. In an alternative embodiment, illustrated in FIG. 7, the pin 316 includes an integral cam follower 338. The combined length of the pin 216 and cam follower 238 is greater that the combined axial length of the orifices 24, 26.

Figure 9:
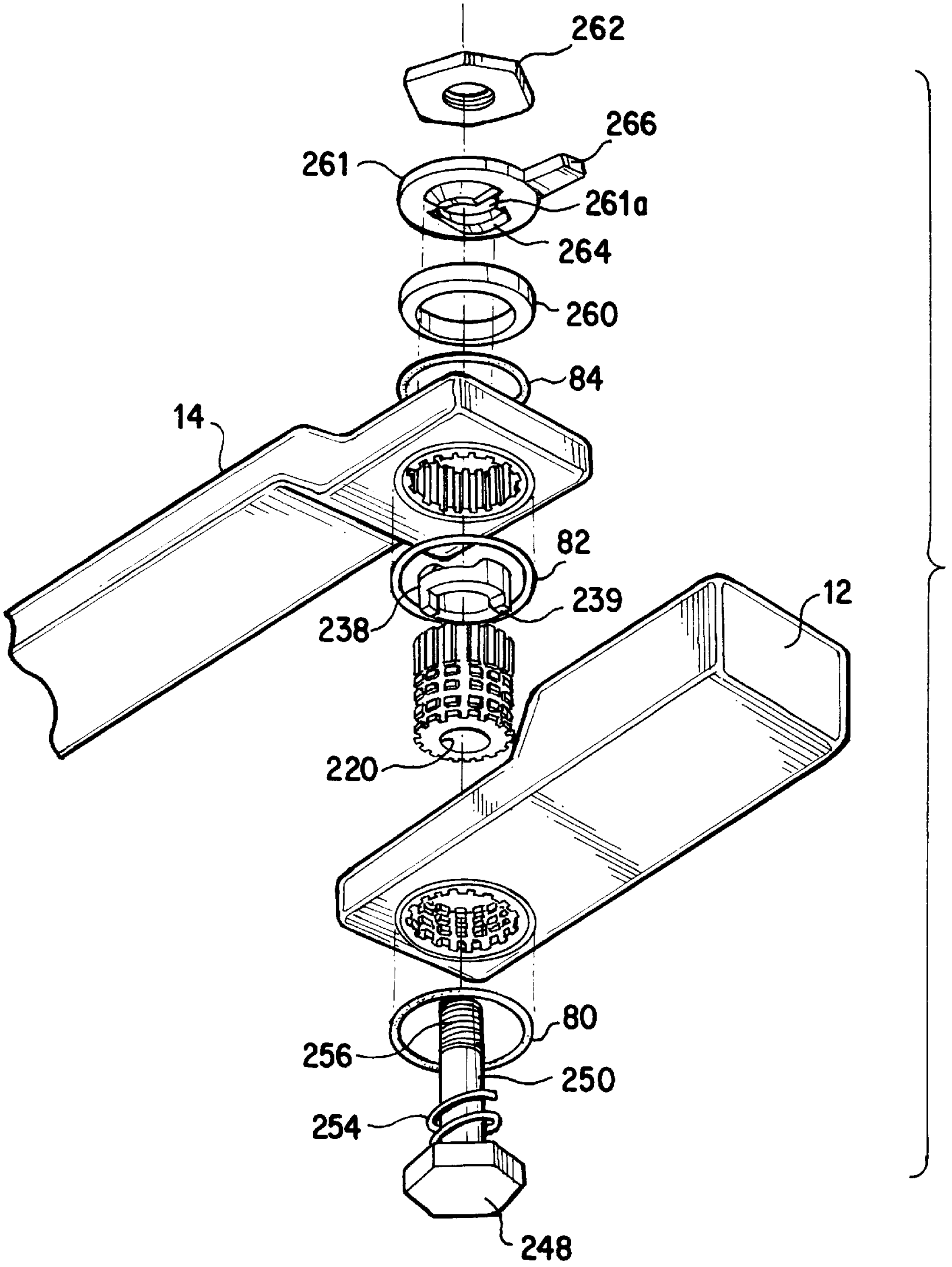
FIG. 9 is an exploded perspective view of the adjustable coupler of FIG. 6.

The splined pin 216 is held in the first and second orifices 24, 26 by a retainer 219. The retainer 219 includes a first retainer 242 cooperating with a second retainer 244 and the actuator 222. The first retainer 242 includes a base 248, a shaft 250 with a threaded distal end 256, and a spring-receiving channel 249 formed in the base 248 and surrounding the shaft 250. The base 248 is sized to overlap the splined orifices 24, 26 to prevent the retainer 242 from entering the orifices 24, 26. The shaft 250 is attached to the base 248 and extends orthogonally therefrom. The shaft 250 is longer than the pin 216 and is sized to fit in the central bore 220 (FIG. 9) with the threaded distal end 256 extending beyond the pin 216. A helical spring 254 is disposed in the channel 249 and about the shaft 250.

The second retainer 244 includes an annular spacer 260, a disk 261 having a central aperture 261*a*, and a nut 262 for engaging the threaded distal end 256 of the shaft 250. The disk 261 includes a cam 264 and a tab 266. The cam 264 is attached to one side of the disk 261 and is sized and configured to engage the cam follower 238. The tab 266 extends outwardly from a peripheral edge of the disk 266 to be engaged by the thumb or finger of a user. The coupler 210 is assembled by putting seals 80, 82, 84 into the seal-receiving channels 23, 25, 27, 29 and inserting the splined pin 216 into the splined orifices 24, 26. The spring 254 is installed on the shaft 250 and the shaft 250 is inserted into the central bore 220 of the pin 216. Thus, the base 248 is disposed against the seal 84 at the bottom of the first member 12 and the spring 254 is compressed between the base 248 and the first end 230 of the pin 216. The annular spacer 260 is placed against the second member 14 and around the threaded distal end 256, and the disk 261 is disposed against the spacer 260 with the cam 264 facing the cam follower 238 and the threaded distal end 256 extending through the central aperture 261*a* and above the disk 261. The nut 262 threads onto the threaded distal end 256 to retain the disk 261 and spacer 260 in position.

When the pin 216, actuator 222 and retainer 219 are installed, the splined pin 216 is operatively disposed in the splined orifices 24, 26 for axial movement between an unlocking position and a locking position. In the unlocking position, illustrated in FIG. 10, the first and second members 12, 14 are free to rotate relative to each other. In the locking position, illustrated in FIG. 11, the first and second members 12, 14 are rotationally locked to each other.

In the unlocking position, the splined portions 230*b*, 230*c*, 230*d* of the pin 216 are disposed in the grooves 31*a*, 31*b*, 31*c* in the first orifice 24, respectively, and the first member 12 is free to rotate about the pin 216. In the locking position, the splined portions 230*a*, 230*b*, 230*c*, 230*d* are positioned to engage the splined orifice portions 24*a*, 24*b*, 24*c*, 24*d* thereby preventing the first member 12 from rotating relative to the pin 216 or the second member 14.

Figure 10:
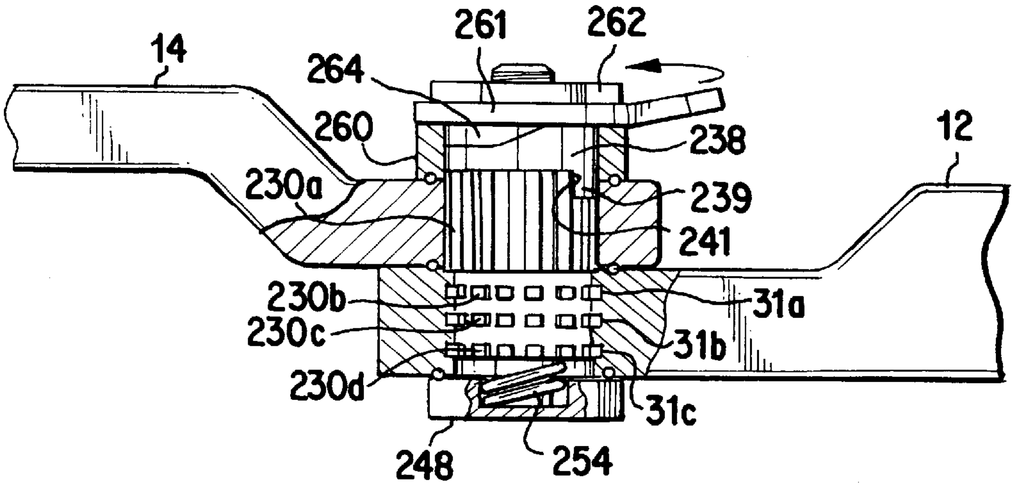
FIG. 10 is a side view, partially cut away, of the adjustable coupler of FIG. 6 illustrating the splined pin in the unlocking position.
Figure 11:
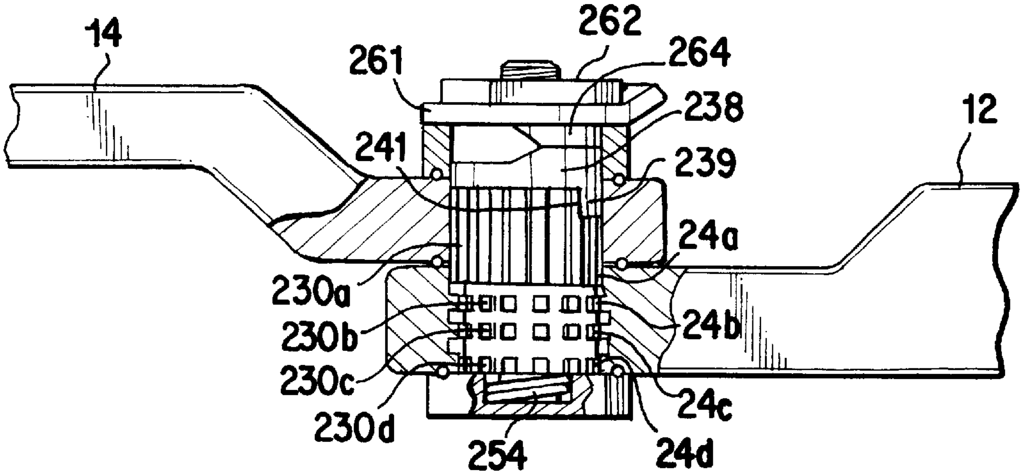
FIG. 11 is a side view, partially cut away, of the adjustable coupler of FIG. 6 illustrating the splined pin in the locking position.

To move the pin 216 to the locking position, illustrated in FIG. 10, the actuator 222 is rotated in a first direction, illustratively counterclockwise. Rotating the actuator 222 rotates the cam 264 to engage the cam follower 238. The retainer 219 holds the actuator 222 against the second member 214, so that the cam 264 pushes downwardly against the cam follower 238 to push the pin 216 downwardly against the biasing force of the spring 254.

To move the pin 216 to the unlocking position, the actuator 222 is rotated in a second direction, illustratively clockwise. Rotating the actuator 222 in the second direction moves the cam 264 to the 25 left, as viewed in FIGS. 10–11, and off the cam follower 238. The biasing force of the spring 254 urges the pin 216 upwardly in the orifices 24, 26, moving the second, third and fourth splined portions 230*b*, 230*c*, 230*d* into the grooves 31*a*, 31*b*, 31*c* and the first splined portion 230*a* out of the first splined orifice 24. When the splined portions 230*b*, 230*c*, 230*d* of the pin 216 are disposed in the grooves 31*a*, 31*b*, 31*c*, the first member 12 is free to rotate about the pin 216.

The above descriptions and drawings are only illustrative of a preferred embodiment of the present invention, and it is not intended that the present invention be limited thereto. For example, the direction of rotation of the actuator is not important to the invention. In addition, the invention has been described with respect to a coupler joining a first and a second member, which are preferably a ratchet head and a handle, respectively. However, the invention is useful for joining any members together where it is desirable to have a plurality of lockable positions. For example, knee or elbow braces for retaining a knee or elbow in a particular position would be helpful for surgery patients or accident victims. Another useful application of the invention is in providing joints for arm-mounted lamps, such as are commonly clamped to the edge of a table or desk. Therefore, the scope of the present invention is not to be considered as limited by the foregoing description, but is only limited by the scope of the appended claims.

What is claimed is:

1. An assembly with a sealed adjustable coupler, the assembly comprising:

a first member having a first orifice;

a second member having a second orifice;

a splined pin for engaging the first orifice and the second orifice, the splined pin including a plurality of longitudinally extending splines and a plurality of circumferentially extending grooves and being movable between a locking position and an unlocking position; and a rotating actuator coupled to the pin, the pin moving axially between the locking position and the unlocking position in response to rotation of the actuator.

2. The assembly of claim 1 wherein the actuator includes a cam and the splined pin includes a cam follower, the cam engaging the cam follower to move the pin in response to rotation of the actuator.

3. The assembly of claim 1 further including a first retainer coupled to the first end of the pin and a second retainer coupled to the second end of the pin, the first and second retainers cooperating with each other to retain the pin in the first and second orifices.

4. The assembly of claim 3 further including a first seal disposed between the first retainer and the first member and a second seal disposed between the second retainer and the second member.

5. The assembly of claim 1 wherein the pin includes a first threaded portion, the rotating actuator further including a second threaded portion configured to engage the first threaded portion to move the pin.

6. The assembly of claim 1 further including a first end and a second end with a first seal disposed adjacent the first end and a second seal disposed adjacent the second end.

7. An assembly with a coupler, the assembly comprising:

a first member with a plurality of longitudinally extending splines;

a second member with a plurality of longitudinally extending splines and a first plurality of circumferentially extending grooves intersecting the plurality of splines;

a splined pin coupled to the first and second members, the pin including a second plurality of circumferential grooves and being movable between a locking position and an unlocking position; and a rotating actuator coupled to the pin, the pin moving axially in response to rotational movement of the actuator, the second plurality of grooves moving into alignment with the first plurality of grooves as the pin moves to the locking position.

8. The assembly of claim 7 wherein the pin includes a first threaded portion and the rotating actuator includes a second threaded portion, the first threaded portion engaging the second threaded portion to move the pin.

9. An adjustable device comprising:

a first member having a first splined orifice;

a second member having a second splined orifice with a plurality of longitudinally extending splines and a first plurality of circumferential grooves, the splines being divided into a first plurality of spline portions by the first plurality of grooves;

a splined pin for engaging the first and second splined orifices, the splined pin including a cam follower, a plurality of longitudinally extending splines and a second plurality of circumferential grooves, the splines being divided into a second plurality of spline portions by the second plurality of grooves; and a rotating actuator having a cam disposed to engage the cam follower, the pin moving axially in the first and second orifices between a locking position and an unlocking position in response to rotation of the actuator, the first plurality of spline portions being aligned with the second plurality of spline portions when the pin is in the locking position.

10. The device of claim 9 wherein the pin includes a first threaded portion and the rotating actuator includes a second threaded portion, the first threaded portion engaging the second threaded portion to move the pin.

11. An assembly with a sealed coupler, the assembly comprising:

a first member;

a second member having a splined orifice with a first plurality of grooves;

a splined pin with a second plurality of grooves, the pin being movable between a locking position and an unlocking position;

a rotating actuator coupled to the pin, the pin moving axially in response to rotational movement of the actuator, the axial movement of the pin moving the first plurality of grooves into alignment with the second plurality of grooves in the locking position;

a retainer coupled to the pin;

a first seal disposed between the retainer and the first member; and a second seal disposed between the actuator and the second member.

12. The assembly of claim 11 wherein the pin includes a first threaded portion and the rotating actuator includes a second threaded portion, the first threaded portion engaging the second threaded portion to move the pin.

* * * * *